(12) United States Patent
Thayer et al.

(10) Patent No.: US 10,886,758 B2
(45) Date of Patent: Jan. 5, 2021

(54) ELECTRICAL SYSTEM WITH HIGH-VOLTAGE SYSTEM LOCKOUT FUNCTION

(71) Applicant: GM Global Technology Operations LLC, Detroit, MI (US)

(72) Inventors: Brandon M. Thayer, Troy, MI (US); Fang Wang, Troy, MI (US); Charles Hua, Ann Arbor, MI (US); Andrew K. Chandler, Plymouth, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 205 days.

(21) Appl. No.: 16/057,019

(22) Filed: Aug. 7, 2018

(65) Prior Publication Data

US 2020/0052508 A1 Feb. 13, 2020

(51) Int. Cl.
*H02J 7/00* (2006.01)
*H02P 27/06* (2006.01)
*B60L 50/51* (2019.01)

(52) U.S. Cl.
CPC ............ *H02J 7/0029* (2013.01); *B60L 50/51* (2019.02); *H02J 7/0063* (2013.01); *H02P 27/06* (2013.01); *B60L 2210/40* (2013.01)

(58) Field of Classification Search
CPC ....... H02J 7/0029; H02J 7/0063; B60L 50/51; B60L 2210/40; H02P 27/06
USPC .................................................. 307/9.1, 10.1
See application file for complete search history.

(56) References Cited

U.S. PATENT DOCUMENTS

2014/0062180 A1  3/2014  Demmerle et al.

*Primary Examiner* — Hal Kaplan
(74) *Attorney, Agent, or Firm* — Quinn IP Law

(57) ABSTRACT

An electrical system includes a battery disconnect unit (BDU) connected to a rechargeable energy storage system (RESS) via a high-voltage bus. The BDU has one or more contactors that close responsive a low-voltage drive current to thereby connect the RESS to the high-voltage bus. A low-voltage drive circuit conducts the drive current to the contactor(s). Opening of a low-voltage connection interrupts the drive current and causes the contactor(s) to transition from the closed state to an open state. The contactor(s) open in response to interruption of the drive current to thereby disconnect the RESS. The contactor(s) may be closed again after a lockout safety procedure, such that reestablishing the electrical connection does not itself re-energize the high-voltage bus. An electrified powertrain includes a transmission, electric machine, power inverter module, and the above-noted electrical system.

17 Claims, 3 Drawing Sheets

ELECTRICAL SYSTEM WITH HIGH-VOLTAGE SYSTEM LOCKOUT FUNCTION

INTRODUCTION

An electrical system of an electrified powertrain, power plant, or other high-voltage system may include separate high-voltage and low-voltage buses. In general, the terms "auxiliary voltage" and "low-voltage" encompass voltage levels of up to 12-15 volts, while the term "high-voltage" describes voltage levels well above auxiliary voltage levels. In a propulsion system of a vehicle having an electrified powertrain, for instance, "high-voltage" may refer to voltage levels of 60-300 volts or more, with certain emerging battery packs having voltage capacities on the order of 500-800 volts.

On the high-voltage bus of a dual-bus electrical system, strategically-positioned fuses and electrical contactors are used to help maintain proper voltage isolation in the event of an electrical fault, with the contactors also being commanded to open during emergency or routine shut-down of the electrical system. Fuses are replaceable circuit elements that default to an open-circuit state, for instance in response to a threshold current. Maintenance efforts may therefore involve an operator accessing a high-voltage component for the purpose of fuse replacement. In contrast to fuses, electrical contactors are controllable and resettable electromagnetic switching devices having a mechanical switching element. The binary open/closed state of the switching element depends on the energized state of a corresponding solenoid coil of the contactor.

Additionally, a combined software- and hardware-based process commonly known as "high-voltage interlock" (HVIL) may be used to monitor the high-voltage bus for an attempted access, such as maintenance of a connected high-voltage electrical component. In general, the HVIL process involves monitoring the electrical continuity of a low-voltage circuit using a controller. In response to a detected discontinuity, the controller commands, via transmission of a switching control signal, the opening of one or more contactors located on the high-voltage bus. Other approaches for reducing high-voltage exposure risk in a dual-bus electrical system include the use of a manual service disconnect (MSD). An MSD is a large pack fuse that is manually removed by service personnel prior to accessing the high-voltage bus, such as when performing the above-noted fuse replacement task. The physical removal of the MSD effectively breaks the RESS into multiple lower-voltage battery sections, thereby reducing the maximum voltage on the high-voltage bus.

SUMMARY

An electrical system is disclosed having a high-voltage system lockout (HVSL) function. The electrical system is configured to reduce reliance on, and possibly eliminate, the above-noted manual service disconnect (MSD) and/or a high-voltage interlock (HVIL) monitoring process. While MSD and HVIL approaches effectively reduce the risk of inadvertent exposure to high-voltage power, for instance in an electrified powertrain, certain advantages may be enjoyed by eliminating pre-programmed HVIL control logic, logic-based contactor control, and/or the substantial packaging space and mass associated with the MSD. Additionally, internal MSD fuse structure tends to be application-specific. The disclosed approach instead provides a simplified and robust high-voltage system lockout (HVSL) topology that may be applied across a wide range of applications.

The electrical system according to an exemplary embodiment includes a high-voltage rechargeable energy storage system (RESS), a high-voltage bus, and a battery disconnect unit (BDU). The BDU includes one or more high-voltage contactors. The open/closed state of the contactor(s) is determined by the contactor's energized state, with the energized state in turn depending on the presence or absence of a low-voltage contactor drive current, e.g., within a corresponding solenoid coil of the contactor in an example solenoid-driven embodiment. The present approach is characterized by an absence of controller-initiated switching control signals to command an open or closed state of the contactors located within the BDU. The low-voltage contactor drive current, which is separately provided by a low-voltage/auxiliary battery, is conducted via a low-voltage contactor drive circuit, e.g., a multi-wire conductor, with such current energizing the contactor into a closed state. The closed state electrically connects the RESS to the high-voltage bus. Each contactor automatically opens when the contactor drive circuit is broken and the drive current is consequently interrupted. While the contactor could be commanded open in some embodiments without interrupting the drive current, the interruption of the drive current always causes the contactor(s) to open.

The high-voltage bus in a non-limiting example embodiment has a minimum voltage level of 60 volts while the contactor drive circuit in such an embodiment has a maximum voltage level of 12-15 volts, i.e., a low-voltage/auxiliary voltage. The low-voltage contactor drive current may be provided via a 12-volt auxiliary battery or a 12-volt output of an auxiliary power module in two exemplary configurations.

The electrical system may include a controller in the form of a battery system manager (BSM), a power inverter module, and a polyphase electrical machine connected to the high-voltage bus via the power inverter module. The BSM may, as an optional control action, automatically discharge the high-voltage bus via switching control of the power inverter module, doing so responsive to opening of the contactors. Thus, a voltage level of the contactor drive circuit may be a feedback variable to the BSM for making this determination.

An electrified powertrain system is also disclosed. According to another exemplary embodiment, the powertrain system includes a transmission having an input member coupled to a load, e.g., drive wheels of a vehicle, and an electric machine having a rotor coupled to the input member. A power inverter module is connected to the electric machine. The powertrain system also includes a high-voltage bus, a rechargeable energy storage system (RESS) connected to the power inverter module via the high-voltage bus, and a high-voltage component electrically connected to the RESS via the high-voltage bus. The BDU having one or more contactors is positioned between the RESS and the high-voltage bus, the contactor(s) being configured to close responsive to a contactor drive current to thereby connect the RESS to the high-voltage bus.

The electrified powertrain system further includes a low-voltage auxiliary battery and a contactor drive circuit connected to the auxiliary battery. The contactor drive circuit is configured to conduct the low-voltage contactor drive current to the contactor and thereby energize the contactor. An electrical connection is located in the contactor drive circuit. Opening the electrical connection prevents access to high-voltage on the high-voltage bus by interrupting the contactor drive current. Reconnection of the electrical connection can be prevented via a padlock or other lockout device after opening so as to prevent the contactors from being re-energized until an associated voltage lockout safety procedure is completed. That is, after disconnecting the RESS, reconnection of the electrical connection in the low-voltage contactor drive circuit alone is insufficient for reenergizing the high-voltage bus, with possible actions such as removal of a lockout device from the electrical connection and/or commanding the contactor(s) to a closed state being needed to reenergize the high-voltage bus.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

Figure 1:
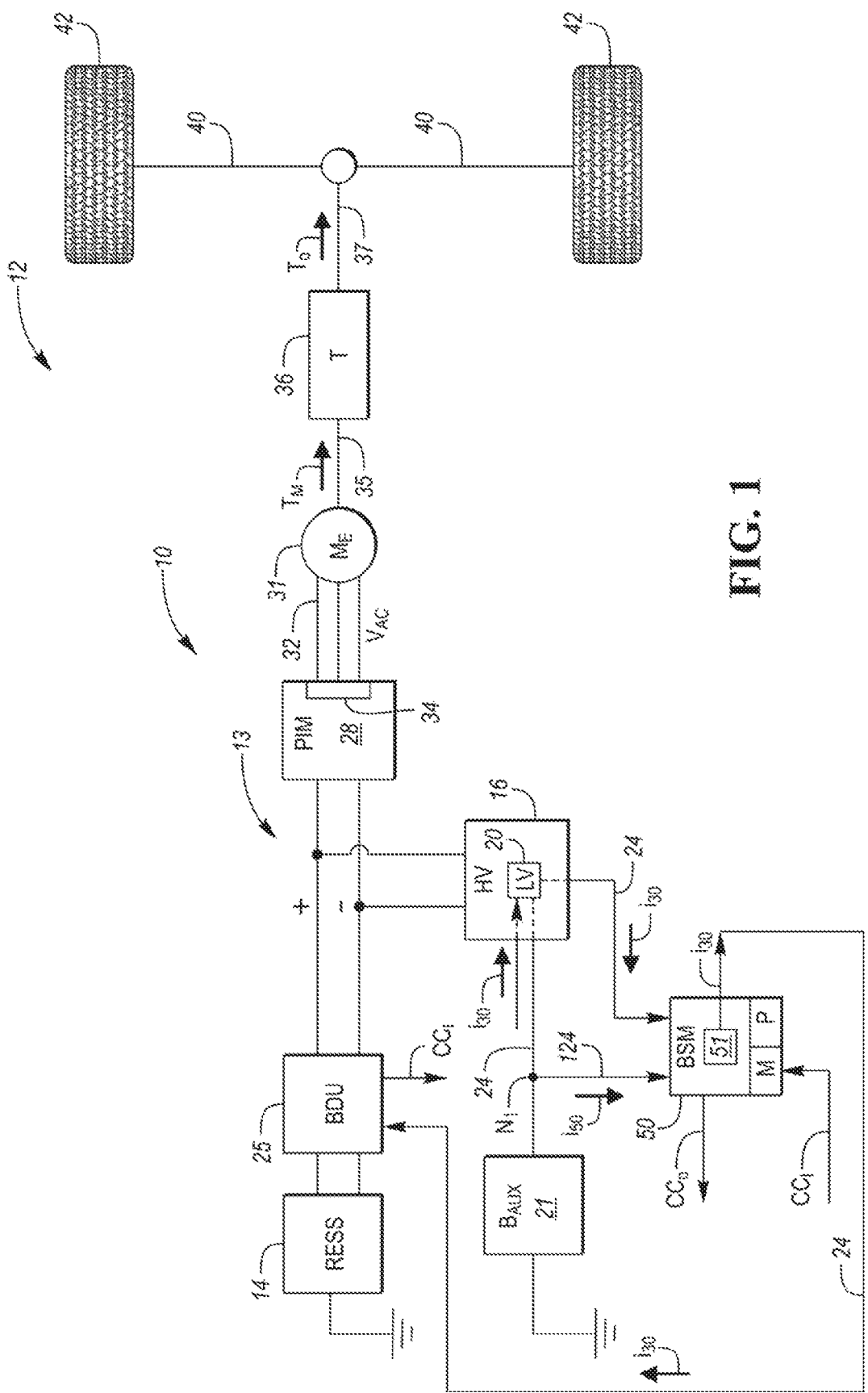
FIG. 1 is a schematic illustration of an example dual-bus electrical system having a rechargeable energy storage system, separate high-voltage and low-voltage buses, and a battery disconnect unit (BDU) containing high-voltage electrical contactors, with the electrical system configured to provide a passive high-voltage system lockout (HVSL) function via the BDU as described herein.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Referring to the drawings, wherein like reference numbers refer to like components, a dual-bus electrical system 10 is shown in FIG. 1. The electrical system 10, which may be used as part of an example vehicle 12 as described herein or as part of a power plant or other mobile or stationary device or system, provides a high-voltage system lockout (HVSL) function that may enable elimination of a manual service disconnect (MSD) and/or high-voltage interlock (HVIL) process as described above.

The electrical system 10 includes a high-voltage (HV) bus 13 connected to a rechargeable energy storage system (RESS) 14. The term "high-voltage" as used herein refers to voltage levels well in excess of 12-15 volt low-voltage/auxiliary voltage levels, e.g., 60-300 volts or higher. Also as used herein, the term "RESS" refers to a multi-cell rechargeable battery pack having a lithium ion, nickel metal hydride, or other application-suitable battery chemistry, as well as associated power electronics required for proper control and thermal regulation of such a battery pack.

As will be described in detail below with reference to FIGS. 2 and 3, within the electrical system 10 of FIG. 1 a low-voltage contactor drive current (arrows $i_{30}$) is provided to a battery disconnect unit (BDU) 25. The BDU 25 includes electromechanical switches in the form of electrical contactors, e.g., the example contactors 30, 130, and 230 of FIG. 2, that open or close corresponding high-current conductive paths between the RESS 14 and high-voltage portions of the electrical system 10. Although omitted for clarity from FIGS. 1 and 2, the BDU 25 may also be configured to measure and report cell voltages, currents, temperatures, states of charge, and/or other values as part of a set of input signals (arrows $CC_I$) to a battery system manager (BSM) 50. The open/closed states of the contactors 30, 130, and 230 of the BDU 25 are determined based on whether the low-voltage contactor drive current (arrows $i_{30}$) is present in a corresponding solenoid coil 30S, 130S, and 230S of the respective contactors 30, 130, and 230 shown in FIG. 2. The BSM 50 could also command the contactors 30, 130, and 230 to open when the contactor drive current (arrows $i_{30}$) is present, but interrupting the contactor drive current (arrows $i_{30}$) always results in the contactors 30, 130, and 230 opening.

Figure 2:
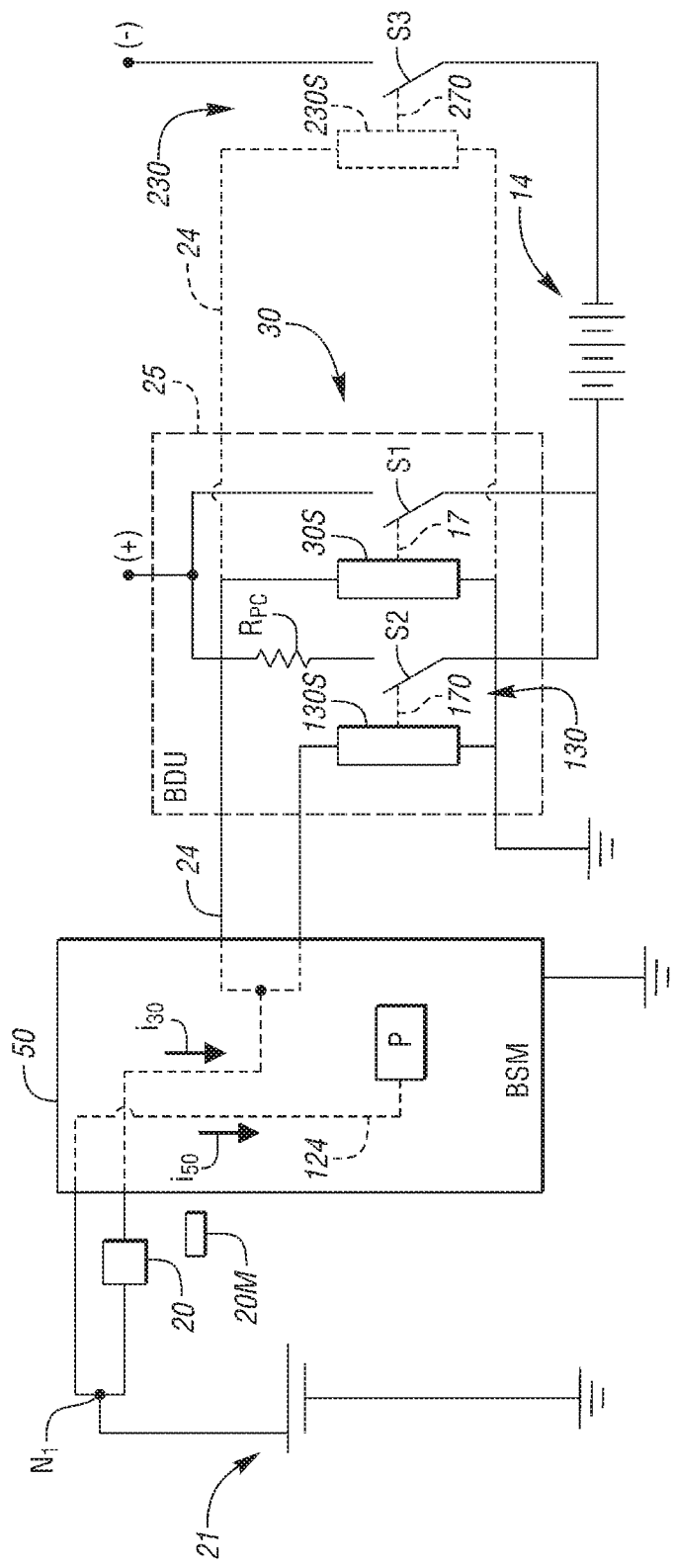
FIG. 2 is a schematic circuit diagram for a portion of the dual-bus electrical system of FIG. 1.

Referring briefly to FIG. 2, the BDU 25 includes at least one high-voltage electrical contactor 30. The BDU 25 may also include one or more additional high-voltage contactors, e.g., a contactor 130 arranged in electrical series with a pre-charge resistor ($R_{PC}$) and/or another contactor 230 connected to the negative (−) bus rail. In the illustrated embodiment of FIG. 1, the BDU 25 is connected between the positive (+) and negative (−) bus rails of the electrical system 10, to the positive (+) bus rail in FIG. 2 when the contactor 230 is not used, and to the positive (+) and negative (−) bus rails when the contactors 130 and 130 are both used. More or fewer contactors may be used within the scope of the disclosure, and therefore the embodiment of FIG. 2 is non-limiting.

An electrical connection 20 is fed by low-voltage power from an auxiliary battery 21 or other low-voltage power supply, such as a lead-acid battery or a low-voltage output of a DC-DC converter (not shown). Thus, the electrical connection 20 remains at low-voltage, as indicated by "LV". The contactors 30, 130, and 230 of the example BDU 25 of FIG. 2, which are positioned on the high-voltage bus 13 between the RESS 14 and a high-voltage component 16 such as an auxiliary power module (APM) or an air conditioning control module (ACCM), are embodied as electromagnetic switching devices configured to close responsive to receipt of the low-voltage contactor drive current (arrow $i_{30}$). A closed state electrically of the contactors 30, 130, and 230 electrically connects the RESS 14 to the remainder of the electrical system 10, i.e., energizes the high-voltage bus 13, while an open state disconnects the RESS 14 as noted above to prevent access to high-voltage on the high-voltage bus 13. That is, the high-voltage bus 13 is not energized when the RESS 14 is disconnected in the disclosed manner, a sequence that happens responsive to creation of an open-circuit condition in the contractor drive circuit 24.

The contactor drive current (arrow $i_{30}$) is conducted via the contactor drive circuit 24, such as to corresponding solenoids coils 30S, 130S, and 230S of the respective example solenoid-driven contactors 30, 130, and 230 of FIG. 2. Passage of the contactor drive current (arrow $i_{30}$) through the solenoid coils 30S, 130S, and 230S in such an embodiment energizes and generates an electromagnetic field around the solenoid coils 30S, 130S, and 230S. Mechanical switching elements S1, S2, and S3 of the respective contactors 30, 130, and 230 have binary states, i.e., open and closed states, and are urged into and held in a closed/conducting state by the generated solenoid electromagnetic field. A corresponding return spring 17, 170, 270 may be coupled to the switching elements S1, S2, and S3 to allow the switching elements to quickly spring open when generation of the electromagnetic field about the solenoid coils 30S, 130S, and 230S is discontinued. In this respect, the contactors 30, 130, and 230 in this and other embodiments, e.g., solid-state embodiments, are normally-open switching devices, with the open state being the default/no-power mode.

In the example embodiment of FIG. 2, the BDU 25 includes the above-noted set of contactors 30, 130, and 230. The BDU 25 may also include a pre-charge resistor ($R_{PC}$) in series with the switching element S2. The auxiliary battery 21, also shown in FIG. 1, may be electrically connected to a node $N_1$. At node $N_1$, auxiliary power is split to provide uninterrupted current flow to a low-voltage controller in the form of the BSM 50, with the BSM 50 having a processor (P). That is, delivery of a low-voltage controller drive current (arrow $i_{50}$) is maintained via a dedicated controller drive circuit 124 that is separate/electrically isolated from the contactor drive circuit 24 for powering associated monitoring and control functions of the BSM 50, and establishing a separate, dedicated current path for passage of the contactor drive current (arrow $i_{30}$) through the contactor drive circuit 24. This construction ensures that interruption of the contactor drive current (arrow $i_{30}$) does not also disable operation of the BSM 50.

The electrical connection 20 located in the contactor drive circuit 24 of FIG. 2 is opened prior to a user servicing the high-voltage bus 13 or components connected thereto. Opening or breaking of the electrical connection 20 interrupts the contactor drive current (arrow $i_{30}$). This in turn starves the example solenoid coils 30S, 130S, and 230S of field-generating energy in the representative solenoid-based configuration of FIG. 2. Such an embodiment may forego use of HVIL. In a possible embodiment, a removable access cover (not shown) may at least partially span or overlap a service opening of the high-voltage component 16, such as an APM as noted above. Removal of such a cover may require opening or breaking the electrical connection 20 in such an embodiment.

To this end, the electrical connection 20 may be optionally embodied as a magnetic reed switch held closed by the magnetic field of a permanent magnet 20M. The permanent magnet 20M may be in proximity to the electrical connection 20, such that opening the electrical connection 20 breaks a magnetic circuit holding the example magnetic switch in a closed state. Such magnetic circuits may be positioned at one or more points located throughout the electrical system 10 of FIG. 1. In other embodiments, a simple male-female electrical socket connection or in-line connector may be used, such that one manually breaks the connection 20 to interrupt the contactor drive current (arrows $i_{30}$), with nothing more required to disconnect the RESS 14.

The BSM 50 of FIG. 1 may be embodied as one or more low-voltage digital computers each having the processor (P), e.g., a microprocessor or central processing unit, as well as memory (M) in the form of read only memory, random access memory, electrically-programmable read only memory, etc., a high-speed clock, analog-to-digital and digital-to-analog circuitry, input/output circuitry and devices, and appropriate signal conditioning and buffering circuitry. Interruption of the solenoid drive current (arrows $i_{30}$) may be monitored by the BSM 50, e.g., via the HVSL monitoring circuit 51, and used to initiate control actions indicative of the disconnection of the RESS 14 from the remainder of the electrical system 10 of FIG. 1, such as recording a diagnostic code or activating an indicator or automatically discharging the high-voltage bus 13.

Functions of the BSM 50 may vary with the application, possibly including monitoring the input signals (arrow $CC_I$) and controlling cell temperatures, states of charge, cell voltages, and/or other performance characteristics or operating parameters of the RESS 14. As such, an auxiliary voltage feed to BSM 50 from the auxiliary battery 21 is maintained regardless of the open/closed state of the electrical connection 20. Use of the split power approach and the node $N_1$ of FIG. 2 is just one possible embodiment for ensuring continuity of the above-described control functions of the BSM 50, with the separate power feed to the BSM 50 shown in FIG. 1 as the controller drive circuit 124. Other approaches may be used, such as a dedicated connection to a low-voltage output of the high-voltage component 16 when the high-voltage component 16 is configured as an example DC-DC power converter or using a dedicated auxiliary power supply.

Referring again to FIG. 1, the electrical system 10 in some example applications may include a power inverter module (PIM) 28. The PIM 28 is electrically connected to phase windings or leads of a polyphase electric machine ($M_E$) 31, such as a polyphase electric traction motor and/or an electric generator, via an alternating current ($V_{AC}$) voltage bus 32. When energized, the electric machine 31 generates and outputs motor torque (arrow $T_M$) to an input shaft 35 of a transmission (T) 36 such as a planetary gear arrangement. Output torque (arrow $T_O$) is transmitted from an output shaft 37 of the transmission 36 to a coupled drive axle 40, and ultimately to road wheels 42 in the illustrated application.

The PIM 28 includes IGBTs, MOSFETs, or other application-suitable semiconductor switches, shown collectively and schematically at 34 for simplicity, having on/off switching states that are controlled responsive to switching signals (arrow $CC_O$) from the BSM 50, as will be appreciated by one of ordinary skill in the art. The switching control signals (arrow $CC_O$) may be used for power inversion or conversion as needed. As residual high-voltage energy may be stored in capacitor banks (not shown) of the PIM 28 and/or the HV component 16 after opening of the contactors 30, 130, and 230 of FIG. 2, the BSM 50 may be configured to automatically discharge the high-voltage bus 13 via transmission of the switching control signals (arrow $CC_O$) to the PIM 28 responsive to opening of contactors 30, 130, and 230. In this manner, stored energy may be dissipated through phase windings of the electric machine 30.

Figure 3:
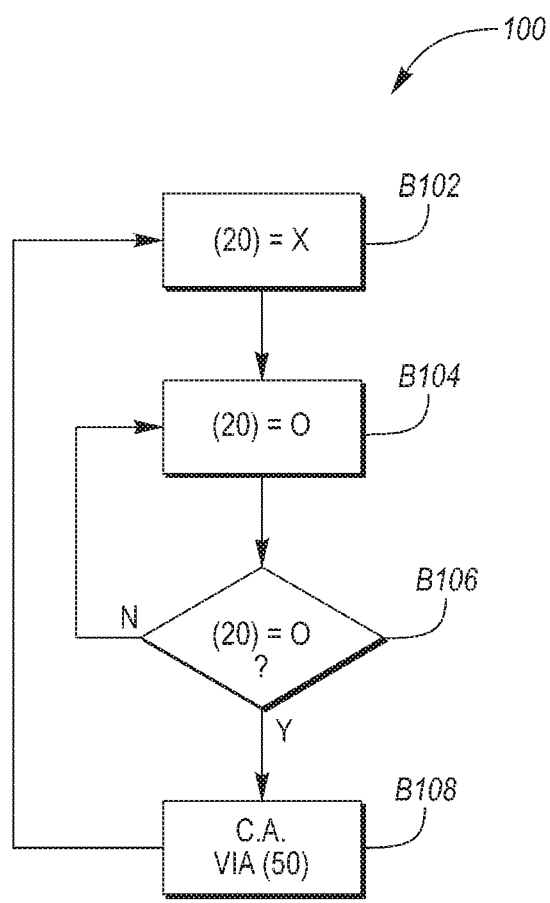
FIG. 3 is a flow chart describing a method for implementing the HVSL function in the electrical system shown in FIGS. 1 and 2.

FIG. 3 depicts an example method 100 of establishing an HVSL function within the example electrical system 10 of FIG. 1. As noted above, HVIL and MSD functions may be eliminated using the method 100, such that the electrical system 10 is characterized by an absence of HVIL and/or MSD functions and associated structure. At block B102, the auxiliary battery 21 shown in FIG. 1 is in an initial state in which the contactors 30, 130, and 230 are energized. The electrical connection 20 in the low-voltage loop of solenoid drive circuit 24 is in a closed state, with such a state abbreviated as "(20)=X" in FIG. 3.

With the electrical connection 20 in the closed state, the contactor drive current (arrow $i_{30}$ of FIGS. 1 and 2) in the solenoid embodiment of FIG. 2 is permitted to reach the contactors 30, 130, and 230, e.g., via the solenoid coils 30S, 130S, and 230S in such an embodiment or via a semiconductor switch (not shown). The low-voltage controller drive current (arrow $i_{50}$ of FIGS. 1 and 2) energizes the processor (P) and other hardware components of the BSM 50 independently of the open/closed state of the electrical connection 20. Power flow to the BSM 50 continues uninterrupted in this manner during normal operation of the electrical system 10.

Block B104 may entail opening the electrical connection 20 of FIG. 2 ("(20)-O"). Opening the electrical connection 20, such as by manually unplugging an in-line connector or moving the above-described magnet 20M in two non-limiting embodiments, severs the contactor drive circuit 24. This action prevents the contactor drive current (arrow $i_{30}$) from reaching and energizing the solenoid coils 30S, 130S, and 230S, or from otherwise energizing the contactors 30, 130 and 230, thereby causing the contactors 30, 130, and 230 to quickly spring open under the return force of the corresponding return springs 17, 170, and 270 of FIG. 2. As a result, the RESS 14 is automatically disconnected without switching control signals from the BSM 50.

Block B106 may include verifying, possibly via associated HVSL logic of the BSM 50 which remains energized by the controller drive current (arrow $i_{50}$), whether the electrical connection 20 is open. For instance, a voltage level of the contactor drive circuit 24 may be read to determine if the contactors 30, 130, 230 are presently energized. The method 100 proceeds to block B108 when the electrical connection 20 is in an open state. Block B106 is repeated when the electrical connection 20 remains closed.

Block B108 may include executing a control action via the BSM 50 responsive to a determination at block B106 that electrical connection 20 has opened. Among the possible control actions of block B108, the BSM 50 may automatically initiate electrical discharge the high-voltage bus 13, e.g., via transmission of the switching control signals (arrow $CC_O$) to the PIM 28 of FIG. 1, and/or may record a diagnostic code indicative of the open state of electrical connection 20. As the controller drive current (arrow $i_{50}$ of FIGS. 1 and 2) freely flows to the BSM 50 over the dedicated low-voltage controller drive circuit 124, ongoing control and monitoring functions of the BSM 50 are not halted due to a break in the contactor drive circuit 24. Likewise, interruption of the contactor drive current (arrows $i_{30}$) may be monitored by the BSM 50, e.g., via the HVSL monitoring circuit 51, and used to initiate control actions indicative of the disconnection of the RESS 14 from the remainder of the electrical system 10 of FIG. 1.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. An electrical system comprising:
a rechargeable energy storage system (RESS);
a high-voltage bus;
a battery disconnect unit (BDU) connected to the RESS via the high-voltage bus, the BDU having a high-voltage contactor configured to close responsive to receipt of a low-voltage contactor drive current to thereby connect the RESS to the high-voltage bus;
a low-voltage auxiliary battery; and
a low-voltage contactor drive circuit connected to the auxiliary battery, and configured to conduct the low-voltage contactor drive current to the high-voltage contactor to thereby energize the high-voltage contactor into a closed state;
wherein the high-voltage contactor is configured to open in response to an interruption of the low-voltage contactor drive current to thereby disconnect the RESS from the high-voltage bus.

2. The electrical system of claim 1, further comprising: a low-voltage electrical connection located in the low-voltage contactor drive circuit, wherein an open state of the low-voltage electrical connection creates an open circuit condition in the low-voltage contactor drive circuit and thereby causes the high-voltage contactor to transition from the closed state to an open state.

3. The electrical system of claim 1, further comprising: a battery system manager (BSM) connected to the auxiliary battery via a dedicated low-voltage BSM drive circuit, such that the BSM remains powered via the BSM drive circuit during the open circuit condition in the low-voltage contactor drive circuit.

4. The electrical system of claim 3, wherein the low-voltage BSM drive circuit is arranged in parallel with the low-voltage contactor drive circuit.

5. The electrical system of claim 3, further comprising: a power inverter module and a polyphase electrical machine connected to the high-voltage bus via the power inverter module.

6. The electrical system of claim 5, wherein the BSM is configured to discharge the high-voltage bus via transmission of a set of switching control signals to the power inverter module to thereby dissipate energy through the polyphase electric machine responsive to the high-voltage contactor being in the open state.

7. The electrical system of claim 1, further comprising: a pre-charge resistor, wherein the high-voltage contactor includes first and second contactors arranged in parallel, and wherein at least one of the first and second contactors is arranged in series with the pre-charge resistor.

8. The electrical system of claim 1, wherein the BDU is connected to a positive bus rail or a negative bus rail of the high-voltage bus.

9. The electrical system of claim 8, wherein the BDU is connected to the positive bus rail and the negative bus rail.

10. An electrified powertrain comprising:
a transmission having an input member coupled to a load;
an electric machine having a rotor coupled to the input member;
a power inverter module (PIM) connected to the electric machine;
a high-voltage bus;
a rechargeable energy storage system (RESS);
a battery disconnect unit (BDU) connected to the RESS via the high-voltage bus, the BDU having a high-voltage contactor configured to close responsive to receipt of a low-voltage contactor drive current to thereby connect the RESS to the high-voltage bus;
a high-voltage component electrically connected to the RESS via the high-voltage bus;
a low-voltage auxiliary battery; and
a low-voltage contactor drive circuit connected to the auxiliary battery, and configured to conduct the low-voltage contactor drive current to the high-voltage contactor and thereby energize the high-voltage contactor into a closed state;

wherein the high-voltage contactor is configured to open in response to an interruption of the low-voltage contactor drive current to thereby disconnect the RESS from the high-voltage bus.

11. The electrified powertrain of claim 10, further comprising:

a low-voltage electrical connection located in the contactor drive circuit, wherein an open state of the electrical connection creates an open circuit condition in the low-voltage contactor drive circuit and thereby causes the high-voltage contactor to transition from the closed state to an open state.

12. The electrified powertrain of claim 10, wherein the high-voltage bus has a minimum voltage level of 60 volts and the low-voltage contactor drive circuit has a maximum voltage level of 15 volts.

13. The electrified powertrain of claim 10, further comprising: a battery system manager (BSM), wherein the BSM is connected to the auxiliary battery via a dedicated low-voltage BSM drive circuit, such that the BSM remains powered when the low-voltage contactor drive circuit is interrupted.

14. The electrified powertrain of claim 13, wherein the dedicated low-voltage BSM drive circuit is arranged in parallel with the low-voltage contactor drive circuit.

15. The electrified powertrain of claim 13, wherein the BSM is configured to discharge the high-voltage bus via transmission of a set of switching control signals to the PIM to dissipate energy through the polyphase electric machine responsive to the high-voltage contactor being in the open state.

16. The electrified powertrain of claim 10, further comprising: a pre-charge resistor, wherein the high-voltage contactor includes first and second contactors arranged in parallel, and wherein the second contactor is arranged in series with the pre-charge resistor.

17. The electrified powertrain of claim 10, wherein the electrified powertrain is configured for use as part of a vehicle and the load is a set of drive wheels of the vehicle.

* * * * *